US009792932B2

(12) United States Patent
Kurihara et al.

(10) Patent No.: US 9,792,932 B2
(45) Date of Patent: Oct. 17, 2017

(54) THIN FILM MAGNETIC HEAD, HEAD GIMBALS ASSEMBLY, HEAD ARM ASSEMBLY, AND MAGNETIC DISK UNIT

(71) Applicant: TDK CORPORATION, Tokyo (JP)

(72) Inventors: Katsuki Kurihara, Tokyo (JP); Mutsumi Fujita, Tokyo (JP); Yosuke Antoku, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/062,687

(22) Filed: Mar. 7, 2016

(65) Prior Publication Data
US 2017/0256274 A1 Sep. 7, 2017

(51) Int. Cl.
G11B 5/31 (2006.01)
G11B 5/48 (2006.01)

(52) U.S. Cl.
CPC ............ *G11B 5/314* (2013.01); *G11B 5/4826* (2013.01)

(58) Field of Classification Search
CPC .......... G11B 5/31; G11B 5/314; G11B 5/4826
USPC .............................. 360/125.32, 125.3–125.35
See application file for complete search history.

(56) References Cited

U.S. PATENT DOCUMENTS

| 6,842,308 | B1 | 1/2005 | Pust et al. |
| 6,989,963 | B2 | 1/2006 | Kautzky et al. |
| 7,193,817 | B2 * | 3/2007 | Lille ................ G11B 5/3133 360/128 |
| 7,787,215 | B2 | 8/2010 | Narushima et al. |
| 7,848,056 | B2 | 12/2010 | Sakamoto et al. |
| 8,169,861 | B1 * | 5/2012 | Komura ............ G11B 5/3116 369/112.27 |
| 8,456,965 | B2 * | 6/2013 | Naniwa ............. G11B 5/3133 369/112.27 |
| 8,607,439 | B1 * | 12/2013 | Wang ................. G11B 5/102 216/62 |
| 8,654,617 | B2 | 2/2014 | Komura et al. |
| 8,760,979 | B1 * | 6/2014 | Chou ................. G11B 5/314 369/13.13 |
| 2002/0064196 | A1 * | 5/2002 | Shiozawa ........ H01S 5/02272 372/45.01 |
| 2003/0112495 | A1 * | 6/2003 | Alduino ............. H01S 5/041 359/333 |
| 2013/0033972 | A1 * | 2/2013 | Hara ................. G11B 5/314 369/13.33 |
| 2013/0250742 | A1 * | 9/2013 | Komura ........... G02B 6/4208 369/13.32 |

* cited by examiner

*Primary Examiner* — Allen T Cao
(74) *Attorney, Agent, or Firm* — Oliff PLC

(57) ABSTRACT

This thin film magnetic head includes: a magnetic pole including a first end surface exposed on an air bearing surface; a coil configured to provide a magnetic flux passing through inside of the magnetic pole; and a heatsink including a second end surface that is provided at a position recessed from the air bearing surface. The second end surface is configured to suppress reflection causing light that has traveled through an entering position on the air bearing surface to return to the entering position.

12 Claims, 11 Drawing Sheets

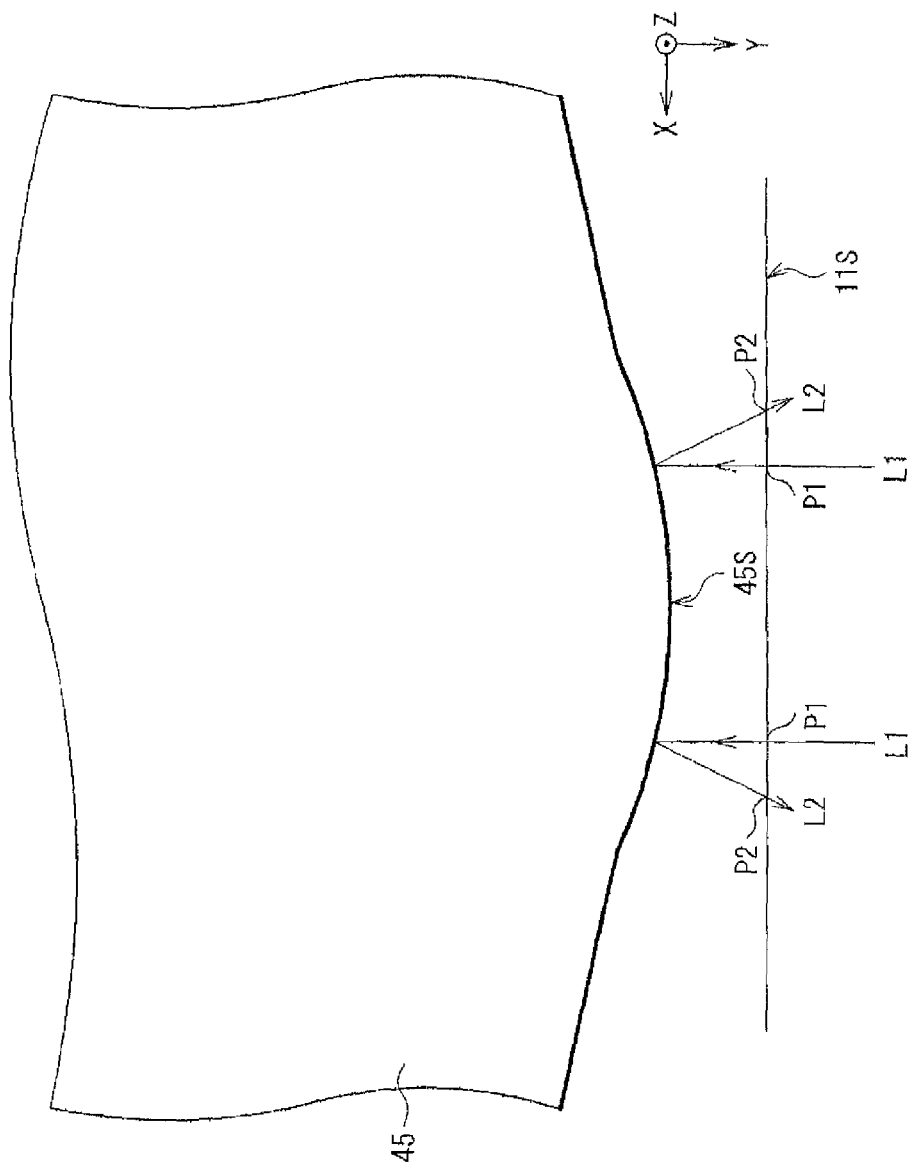

THIN FILM MAGNETIC HEAD, HEAD GIMBALS ASSEMBLY, HEAD ARM ASSEMBLY, AND MAGNETIC DISK UNIT

BACKGROUND

The invention relates to a thin film magnetic head, a head gimbals assembly, a head arm assembly, and a magnetic disk unit.

A magnetic disk unit has been used for writing and reading magnetic information (hereinafter, simply referred to as information). The magnetic disk unit may include, for example, in a housing thereof, a magnetic disk in which information is stored, and a thin film magnetic head that writes information into the magnetic disk and reads information stored in the magnetic disk. The magnetic disk is supported by a rotary shaft of a spindle motor, which is fixed to the housing, and rotates around the rotary shaft. In contrast, the thin film magnetic head is formed on a side surface of a magnetic head slider provided on one end of a suspension, and includes a magnetic write element and a magnetic read element that have an air bearing surface (ABS) facing the magnetic disk. In particular, as the magnetic read element, a magnetoresistive (MR) element exhibiting MR effect is generally used. The other end of the suspension is attached to an end tip of an arm that is supported and allowed to pivot by a fixed shaft that is installed upright inside the housing.

Incidentally, in recent years, along with a progress in higher recording density (higher capacity) of the magnetic disk, reduction in recording track width is progressing. Such reduction in recording track width results in reduction in the size of the thin film magnetic head. Thus, signal recording performance of the magnetic write element on the magnetic disk is weakened and intensity of signal magnetic field from the magnetic disk is weakened as well. To compensate deterioration in these functions, for example, it may be necessary to generate a stronger write magnetic field or reduce size of a magnetic spacing (bring the ABS of the thin film magnetic head closer to a surface of the magnetic disk).

Accordingly, for example, to generate a strong write magnetic field, it is conceivable to cause a larger write current to flow during information writing operation. In a case of causing a large current to flow, however, the thin film magnetic head itself generates heat, which may cause expansion of the thin film magnetic head toward the magnetic disk that is so-called thermal protrusion. When thermal protrusion occurs in such a way, reliability of the magnetic recording device may be impaired.

A large number of technologies to suppress occurrence of thermal protrusion have been reported. For example, U.S. Pat. Nos. 6,842,308 and 6,989,963 each disclose a technology in which a heat dissipation layer made of a material having large thermal conductivity is so provided as to cover a thin film coil generating a magnetic flux to enhance heat dissipation, thereby suppressing occurrence of thermal protrusion.

SUMMARY

Incidentally, in recent years, reduction in size of the thin film magnetic head is remarkably progressing in order to handle higher recording density (higher capacity) of the magnetic disk. Thus, an area in which a heat dissipation layer is formable is reduced. For such a reason, it is desirable to increase the thickness of the heat dissipation layer in order to secure heat capacity of the heat dissipation layer.

Such a heat dissipation layer, however, is formed of metal such as copper (Cu), which reflects light from outside. For example, light applied to the air bearing surface may be reflected by a forward end surface of the heat dissipation layer as returning light toward entering side in photolithography process to form an irregular structure of the air bearing surface. Such returning light may interfere with the photolithography processing, which may result in inaccurate dimension of the irregular structure of the air bearing surface.

Accordingly, it is desirable to provide a thin film magnetic head including a heat dissipation layer that has high heat dissipation and less interferes with processing of an air bearing surface.

A thin film magnetic head according to an embodiment of the invention includes: a magnetic pole including a first end surface exposed on an air bearing surface; a coil configured to provide a magnetic flux passing through inside of the magnetic pole; and a heatsink including a second end surface that is provided at a position recessed from the air bearing surface. The second end surface is configured to suppress reflection causing light that has traveled through an entering position on the air bearing surface to return to the entering position.

A head gimbals assembly, a head arm assembly, and a magnetic disk unit according to respective embodiments of the invention each include the above-described thin film magnetic head.

In the thin film magnetic head according to the embodiment of the invention, the second end surface of the heatsink is configured to suppress reflection causing the light that has traveled through the entering position on the air bearing surface to return to the entering position. Therefore, accurate patterning is performed while moderating adverse effect by returning light in processing of the air bearing surface. Thus, according to the head gimbals assembly, the head arm assembly, and the magnetic disk unit each provided with the thin film magnetic head, the magnetic head slider including the accurately-processed air bearing surface with high dimension accuracy is provided, which secures stable floating of the magnetic head slider during operation. This is advantageous to handling of higher density recording.

BRIEF DESCRIPTION OF DRAWINGS

FIG. 3B is a plan view illustrating a part surrounded by an alternate long and two short dashes line in FIG. 3A in an enlarged manner.

DETAILED DESCRIPTION

Some embodiments of the invention are described in detail below with reference to drawings.

<Configuration of Magnetic Disk Unit>

Figure 1:
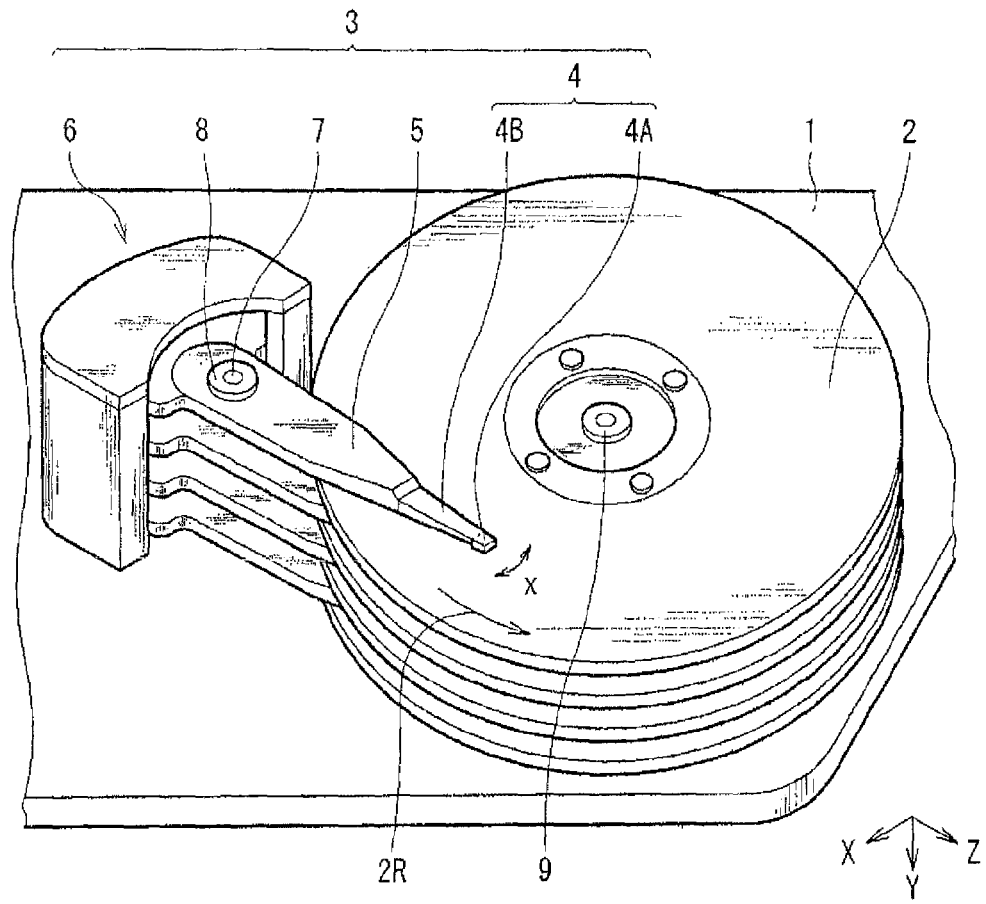
FIG. 1 is a perspective view illustrating a configuration of a magnetic disk unit including a thin film magnetic head according to an embodiment of the invention.

First, referring to FIG. 1 and FIG. 2, a configuration of a magnetic disk unit according to an embodiment of the invention is described below. FIG. 1 is a perspective view illustrating an internal configuration of the magnetic disk unit according to the present embodiment. The magnetic disk unit adopts a contact-start-stop (CSS) operation system as a driving system. The magnetic disk unit may include a magnetic disk 2 and a head arm assembly (HAA) 3, for example, in a housing 1. The magnetic disk 2 serves as a magnetic recording medium in which information is to be written. The HAA 3 is configured to write information into the magnetic disk 2 and read the written information. The HAA 3 includes a head gimbals assembly (HGA) 4, an arm 5 supporting a base of the HGA 4, and a driver 6 as a power source to allow the arm 5 to pivot. The HGA 4 includes a magnetic head slider (hereinafter, simply referred to as "slider") 4A having a side surface provided with a thin film magnetic head 10 (described later) according to the present embodiment, and a suspension 4B having an end provided with the slider 4A. The arm 5 supports the other end of the suspension 4B (an end opposite to the end provided with the slider 4A). The arm 5 is so configured as to be pivotable around a fixed shaft 7 with a bearing 8 in between. The fixed shaft 7 is fixed to the housing 1. The driver 6 may be configured of, for example but not limited to, a voice coil motor. Note that the magnetic disk unit has a plurality of (four in FIG. 1) magnetic disks 2, and the sliders 4A are disposed corresponding to recording surfaces (a front surface and a back surface) of the respective magnetic disks 2. Each of the sliders 4A is movable in a direction across recording tracks (in an X-axis direction) in a plane parallel to the recording surfaces of each of the magnetic disks 2. In contrast, the magnetic disk 2 rotates around a spindle motor 9 fixed to the housing 1 in a rotation direction 2R substantially orthogonal to the X-axis direction. The rotation of the magnetic disk 2 and the movement of the slider 4A cause information to be written into the magnetic disk 2 or cause written information to be read out.

Figure 2:
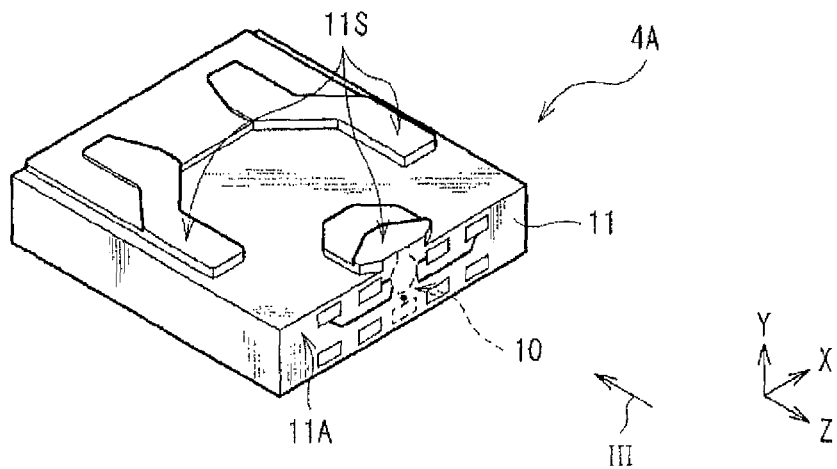
FIG. 2 is a perspective view illustrating a configuration of a slider in the magnetic disk unit illustrated in FIG. 1.

FIG. 2 illustrates a configuration of the slider 4A illustrated in FIG. 1. The slider 4A has a block-shaped base 11 that may be formed of, for example, AlTiC ($Al_2O_3$.TiC). The base 11 may be substantially formed as a hexahedron, for example, and one surface thereof corresponds to an ABS 11S that faces the recording surface of the magnetic disk 2 and is disposed in proximity thereto. When the magnetic disk unit is not driven, namely, when the spindle motor 9 is stopped and the magnetic disk 2 does not rotate, the ABS 11S and the recording surface are in contact with each other. When the magnetic disk 2 is caused to start rotating at a high speed by the spindle motor 9, air flow occurs between the recording surface and the ABS 11S, and the slider 4A floats, by lift force caused by the air flow, along a direction (in an Y-axis direction) orthogonal to the recording surface, thereby forming a certain spacing (magnetic spacing) between the ABS 11S and the magnetic disk 2. In addition, the thin film magnetic head 10 is provided on an element forming surface 11A that is one side surface orthogonal to the ABS 11S.

<Detailed Configuration of Thin Film Magnetic Head 10>

Figure 3A:
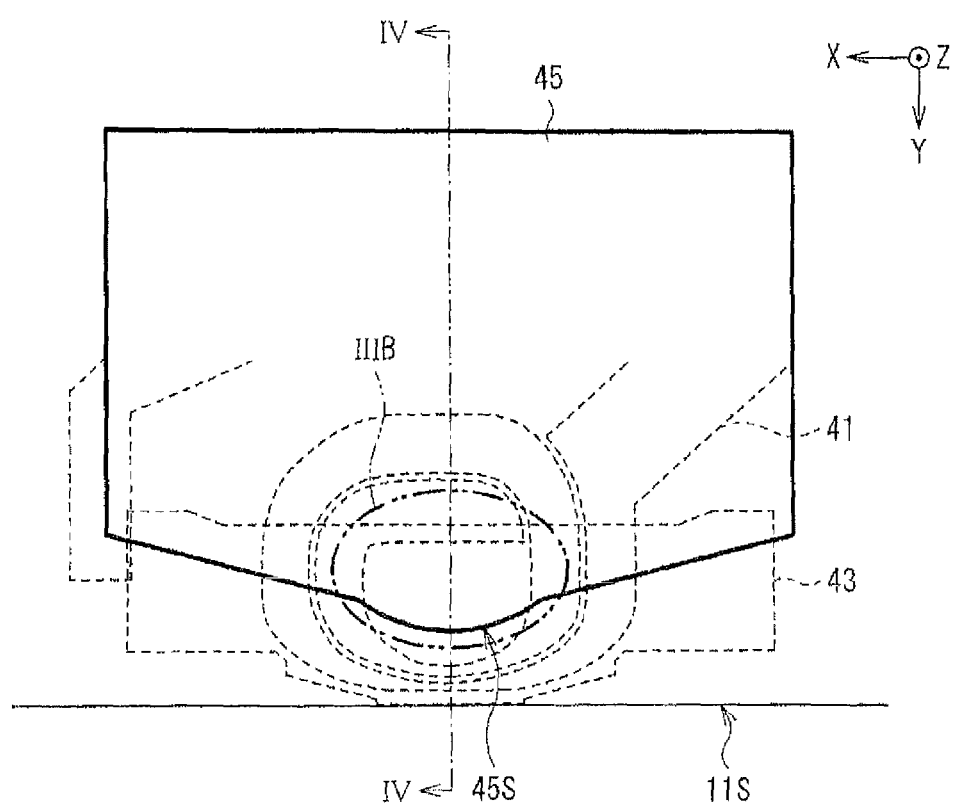
FIG. 3A is a plan view illustrating a configuration of a main part of the thin film magnetic head illustrated in FIG. 2 as viewed from an arrow III direction.
Figure 4:
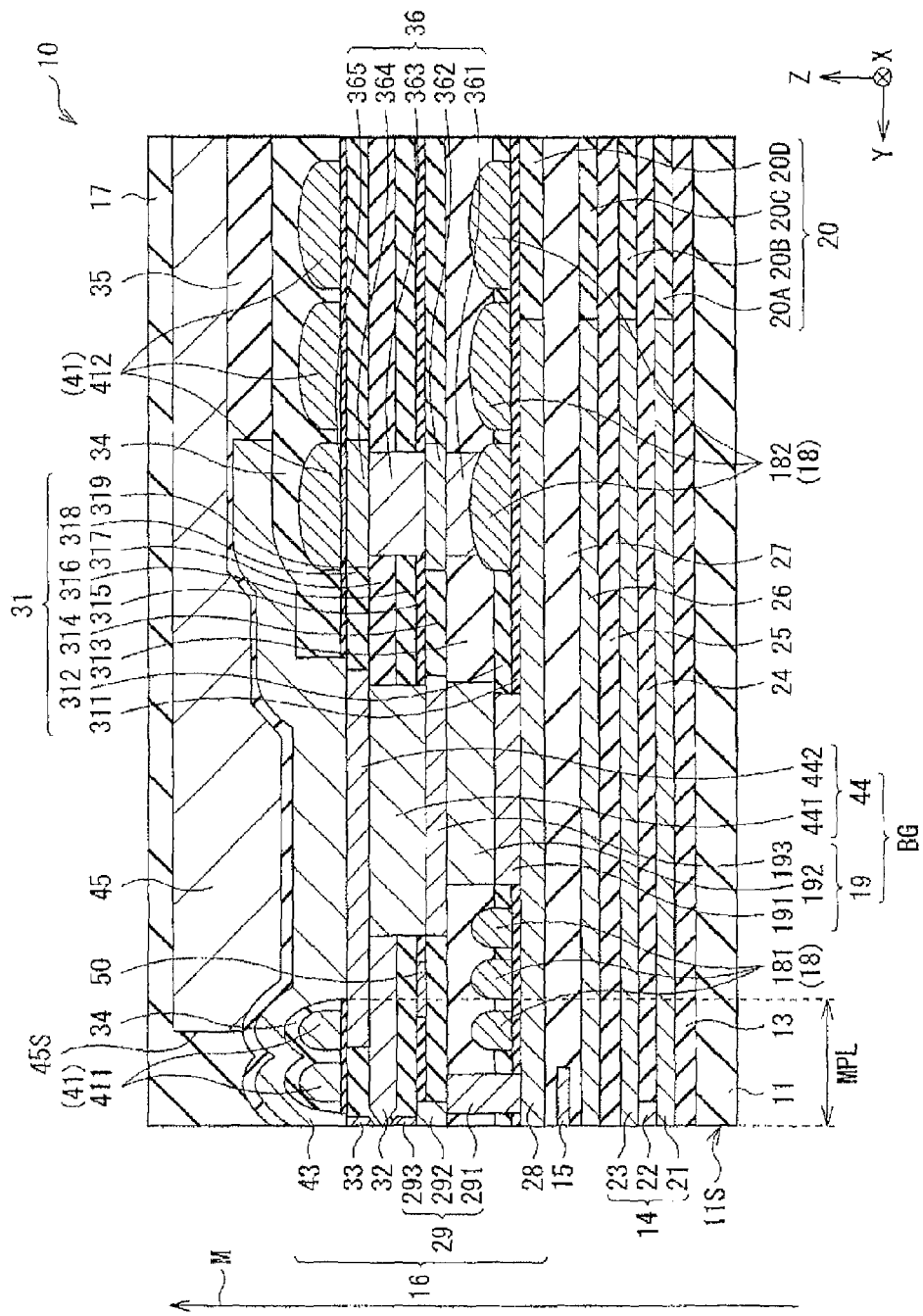
FIG. 4 is a sectional diagram illustrating a structure of the thin film magnetic head illustrated in FIG. 3A in an arrow direction along a line IV-IV.

Next, the thin film magnetic head 10 is described in more detail with reference to FIGS. 3A, 3B, and 4. FIG. 3A is a plan view of the thin film magnetic head 10 as viewed from a direction of an arrow III illustrated in FIG. 2, and FIG. 3B is a plan view of the thin film magnetic head 10 and schematically illustrates a region surrounded by an alternate long and two short dashes line of FIG. 3A in an enlarged manner. Also, FIG. 4 is a sectional diagram of the thin film magnetic head 10 at a center position thereof in a track width direction and illustrates a structure in an arrow direction along a line IV-IV illustrated in FIG. 3A. Note that an up-arrow M illustrated in FIG. 4 indicates a direction in which the magnetic disk 2 moves relative to the thin film magnetic head 10.

In the following description, dimensions in the X-axis direction, the Y-axis direction, and the Z-axis direction are referred to as "width", "height", and "thickness", respectively, and closer side to the air bearing surface 11S and farther side from the air bearing surface 11S in the Y-axis direction are referred to as "forward (or, in front of)" and "backward (or behind)", respectively. Moreover, front side and back side in the direction of the arrow M are referred to as "trailing side" and "leading side", respectively. The X-axis direction and the Z-axis direction are referred to as "cross track direction" and "down track direction", respectively.

The thin film magnetic head 10 is to perform magnetic processing on the magnetic disk 2, and for example, may be a composite head that is allowed to perform both read processing and write processing.

For example, as illustrated in FIG. 4, the thin film magnetic head 10 may include an insulating layer 13, a read head section 14, a write head section 16, an insulating layer 35, a heatsink 45, and a capping layer 17 that are stacked in order on the base 11. The thin film magnetic head 10 has the ABS 11S as one side surface common to these layers. An insulating layer 25, an intermediate shield layer 26, and an insulating layer 27 that are stacked in order on the read head section 14 are provided between the read head section 14 and the write head section 16.

The insulating layer 13 and the capping layer 17 may be formed of, for example, a non-magnetic insulating material such as aluminum oxide. Examples of aluminum oxide may include alumina ($Al_2O_3$).

(Read Head Section 14)

The read head section 14 uses magneto-resistive effect (MR) to perform read processing. The read head section 14 may include, for example, a lower shield layer 21, an MR element 22, and an upper shield layer 23 that are stacked in order on the insulating layer 13.

The lower shield layer 21 and the upper shield layer 23 may be each formed of, for example, a soft magnetic metal material such as a nickel-iron alloy (NiFe), and are disposed to face each other with the MR element 22 in between in the stacking direction (in the Z-axis direction). The lower shield layer 21 and the upper shield layer 23 each have an end surface exposed on the ABS 11S, and extend backward from the ABS 11S. Such a configuration allows the lower shield layer 21 and the upper shield layer 23 to serve to magnetically isolate the MR element 22 from its surroundings and protect the MR element 22 from influence of unnecessary magnetic field.

One end surface of the MR element 22 is exposed on the ABS 11S, and other end surfaces thereof are in contact with an insulating layer 24 filling a space between the lower shield layer 21 and the upper shield layer 23. The insulating layer 24 may be formed of an insulating material such as aluminum oxide ($Al_2O_3$), aluminum nitride (AlN), silicon dioxide ($SiO_2$), and diamond-like carbon (DLC).

The MR element 22 serves as a sensor to read out magnetic information written in the magnetic disk 2. The MR element 22 may be, for example, a current perpendicular to plane (CPP)-giant magnetoresistive (GMR) element, sense current of which flows inside thereof in a stacking direction. Here, the lower shield layer 21 and the upper shield layer 23 each serve as an electrode to supply the sense current to the MR element 22.

In the read head section 14 having such a configuration, a magnetization direction of a free layer (not illustrated) included in the MR element 22 changes in response to a signal magnetic field from the magnetic disk 2. Thus, the magnetization direction of the free layer shows a change relative to a magnetization direction of a pinned layer (not illustrated) also included in the MR element 22. When the sense current flows through the MR element 22, the relative change in the magnetization direction appears as a change in electric resistance. Thus, the signal magnetic field is detected with use of the change and the magnetic information is accordingly read out.

As mentioned above, the insulating layer 25, the intermediate shield layer 26, and the insulating layer 27 are stacked in order on the read head section 14. A resistance sensor 15 that is partially exposed on the ABS 11S is embedded in the insulating layer 27. A lower yoke 28 configuring a part of the write head section 16 is provided on the insulating layer 27. A part behind the lower shield layer 21 is occupied by an insulating layer 20A, a part behind the upper shield layer 23 is occupied by an insulating layer 20B, a part behind the intermediate shield layer 26 is occupied by an insulating layer 20C, and a part behind the lower yoke 28 is occupied by an insulating layer 20D. Note that, in the specification, the insulating layers 20A to 20D are collectively referred to as an insulating layer 20 in some cases. The intermediate shield layer 26 serves to prevent a magnetic field generated in the write head section 16 from reaching the MR element 22, and may be made of, for example, a soft magnetic metal material such as NiFe. The insulating layers 25 and 27 may be each made of the similar material to that of the insulating layer 24, for example.

(Write Head Section 16)

The write head section 16 is a so-called perpendicular magnetic write head performing write processing of perpendicular magnetic recording system. The write head section 16 may include, for example, the lower yoke 28, a lower coil 18, a leading shield 29, a heating element 50, a magnetic pole 32, a pedestal yoke 33, an upper coil 41, and an upper yoke 43 that are stacked in order on the insulating layer 27. The lower coil 18 and the leading shield 29 are embedded in an insulating layer 31. The upper coil 41 is embedded in the insulating layer 34. A space, between the lower coil 18 and the upper coil 41, behind the leading shield 29 is occupied by the insulating layer 31 (311 to 319). The heating element 50 is embedded in the insulating layer 31.

The write head section 16 further includes a back gap BG configured of a lower back gap 19 and an upper back gap 44. The lower back gap 19 is coupled to the lower yoke 28, and the upper back gap 44 is coupled to the upper yoke 43. Here, the lower back gap 19 includes magnetic layers 191 to 193 that are stacked in order on the lower yoke 28. In addition, the upper back gap 44 includes a magnetic layer 441 and a magnetic layer 442 that are stacked in order on the magnetic layer 193 of the lower back gap 19. A top surface of the magnetic layer 442 is in contact with a bottom surface of the upper yoke 43.

The upper coil 41 generates, in response to supply of a current, a recording-use magnetic flux inside a magnetic path that is configured mainly of the leading shield 29, the lower yoke 28, the lower back gap 19, the upper back gap 44, the upper yoke 43, and the magnetic pole 32. In contrast, the lower coil 18 generates a magnetic flux for suppressing leakage mainly in order to prevent the recording-use magnetic flux generated in the upper coil 41 from unintentionally reaching (being leaked) to the read head section 14. The current flows through the lower coil 18 in a direction opposite to a direction of the current flowing through the upper coil 41. The lower coil 18 and the upper coil 41 each may be formed of, for example, a highly-electroconductive material such as copper (Cu), and have a structure (a spiral structure) winding around a region occupied by the back gap BG (the lower back gap 19 and the upper back gap 44) in the stacked-layer plane (in the XY plane). The lower coil 18 is provided on the insulating layer 311 and is embedded in the insulating layer 312 and the insulating layer 313. The upper coil 41 is provided on the insulating layer 319 and is embedded in the insulating layer 34. Also, a part of a backward part 182 of the lower coil 18 and a part of a backward part 412 of the upper coil 41 are coupled to each other through a pillar 36 that extends in a thickness direction through the insulating layer 31. The lower coil 18 and the upper coil 41 are coupled in series to each other through the pillar 36. The pillar 36 has a stacked structure configured of electroconductive layers 361 to 365 that are stacked in order between the backward part 182 of the lower coil 18 and the backward part 412 of the upper coil 41. Note that, in FIG. 3A, only the ABS 11S, the upper coil 41, the back gap BG, the pillar 36, and the heating element 50 are illustrated and other components such as the lower coil 18 are not illustrated in order not to deteriorate visibility.

A forward part 181 of the lower coil 18, namely, a part of the lower coil 18 located between the lower back gap 19 and the ABS 11S may preferably have a size in the Y direction smaller than the size, in the Y direction, of the backward part 182 of the lower coil 18 that is located behind the lower back gap 19 (FIG. 4). Likewise, the size, in the Y direction, of a forward part 411 of the upper coil 41 that is located between the upper back gap 44 and the ABS 11S may be preferably smaller than the size, in the Y direction, of the backward part 412 of the upper coil 41 that is located behind the upper back gap 44 (FIG. 4). This is because making the size of the forward part 181 and the forward part 411 smaller in the Y direction is advantageous to reduction in magnetic path length MPL (see FIG. 4).

The lower yoke 28, the leading shield 29, the lower back gap 19, the upper yoke 43, the upper back gap 44, and the pillar 36 are each formed of, for example, a soft magnetic metal material with high saturation flux density such as NiFe. The lower yoke 28 and the upper yoke 43 are magnetically coupled to each other through the back gap BG. The leading shield 29 is coupled to a forward part of the top surface of the lower yoke 28, and is so disposed as to be partially exposed on the ABS 11S. The leading shield 29 may have a structure in which, for example, a lower layer part 291, an intermediate part 292, and an upper layer part 293 are stacked in order along the ABS 11S. In the example of FIG. 4, the lower layer part 291 is provided at a position slightly recessed from the ABS 11S, and the intermediate part 292 and the upper layer part 293 are so provided as to be exposed on the ABS 11S. The insulating layers 311 to 316 are so stacked in order behind the leading shield 29 as to cover the lower yoke 28 and to cause the lower coil 18 to be embedded therein.

The leading shield 29 serves as a return path on the leading side, and disperses a part of a write magnetic field emitted from the magnetic pole 32 to the leading side, thereby reducing a wide adjacent track erase (WATE) effective magnetic field. The WATE effective magnetic field refers to an effective magnetic field that influences adjacent tracks in a wide region (for example, tracks in two to ten lanes next to a track to be written).

The magnetic pole 32 includes an end surface exposed on the ABS 11S and extends backward from the ABS 11S. The magnetic pole 32 may be formed of, for example, a magnetic material with high saturation flux density such as an iron-based alloy. Examples of the iron-based alloy may include an iron-cobalt alloy (FeCo) and an iron-cobalt-nickel alloy (FeCoNi). The magnetic pole 32 contains a magnetic flux generated in the lower coil 18 and the upper coil 41, and emits the magnetic flux from the end surface exposed on the ABS 11S, thereby generating a write magnetic field.

In the write head section 16 having such a configuration, a magnetic flux is generated, by the current (the write current) flowing through the upper coil 41, inside the magnetic path configured mainly of the leading shield 29, the lower yoke 28, the lower back gap 19, the upper back gap 44, the upper yoke 43, and the magnetic pole 32. As a result, the write magnetic field (the signal magnetic field) is generated near the end surface of the magnetic pole 32 exposed on the ABS 11S, and the write magnetic field reaches a predetermined region of the recording surface of the magnetic disk 2.

(Detailed Configuration of Heatsink 45)

As illustrated in FIG. 4, the heatsink 45 is provided on the upper yoke 43 of the write head section 16 with the insulating layer 35 in between. The heatsink 45 serves to absorb heat that is generated in the write head section 16, mainly, heat that is generated by the upper coil 41 in response to the write current flowing therethrough, and to emit the heat to the outside. The heatsink 45 may be preferably formed of, for example, non-magnetic high electroconductive metal such as copper (Cu).

The heatsink 45 includes a forward end surface 45S at a position recessed from the ABS 11S. The forward end surface 45S suppresses reflection causing light that has traveled through the ABS 11S to return toward the ABS 11S in a direction in which the light has traveled. More specifically, as illustrated in FIG. 3A, the forward end surface 45S may be so curved as to protrude toward the ABS 11S and to include a part inclined with respect to the ABS 11S, in the stacked layer plane (in the XY plane). Note that, in the present embodiment, a part of the forward end surface 45S is inclined with respect to the ABS 11S in the XY plane.

A thickness (for example, an average thickness) of the heatsink 45 may be desirably larger than the thickness (for example, an average thickness) of the magnetic pole 32. This is because such a thickness makes it possible to enhance heat capacity and sufficiently absorb heat generated by the upper coil 41 and other components.

[Method of Manufacturing Thin Film Magnetic Head]

Next, a method of manufacturing the thin film magnetic head 10 is described mainly making reference to FIG. 4.

First, the insulating layer 13 is formed on the entire element forming surface 11A of the base 11. Subsequently, the read head section 14, the insulating layer 25, the intermediate shield layer 26, the insulating layer 27, and the write head section 16 are sequentially formed on the insulating layer 13.

Next, the insulating layer 35 made of a non-magnetic insulating material may be so formed by, for example, sputtering as to cover the entire upper yoke 43. Thereafter, for example, the heatsink 45 may be selectively formed at the position, on the insulating layer 35, recessed from the ABS 11S.

Thereafter, the capping film 17 may be so formed by sputtering or other method as to cover the heat sink 45 followed by planarization processing by CMP or other method. Finally, for example, mechanical polishing, pattern etching processing, or other processing may be performed on the slider 4A to perform predetermined processing such as formation of the ABS 11S. As a result, the thin film magnetic head 10 including the read head section 14, the write head section 16, and the heatsink 45 is completed.

[Operation and Action of Magnetic Disk Unit]

Subsequently, operation and action of the magnetic disk unit including the thin film magnetic head 10 that is configured as above are described.

In the magnetic disk unit, when writing (recording) and reading (reproducing) of magnetic information are performed, the magnetic disk 2 is rotated at high speed in the direction of the arrow 2R (FIG. 1) by the spindle motor 9. Thus, the slider 4A floats from the recording surface of the magnetic disk 2. At this time, the ABS 11S of the slider 4A (the thin film magnetic head 10) faces the recording surface of the magnetic disk 2 with a fixed spacing in between.

Here, to stably and accurately perform the writing (recording) operation and the reading (reproducing) operation of the magnetic information, it is necessary to stably maintain the floating height of the slider 4A from the recording surface of the magnetic disk 2.

As illustrated in FIG. 3B, in the present embodiment, the forward end surface 45S of the heatsink 45 is so configured as to include the part curved with respect to the ABS 11S. Therefore, the forward end surface 45S serves to suppress reflection causing light L1 that has traveled through an entering position P1 on the ABS 11S to return to the entering position P1. In other words, the forward end surface 45S serves to reflect the light L1 that has traveled from the ABS 11S toward a direction different from that traveling direction to cause the reflected light L2 to exit from an exiting position P2 that is different from the entering position P1. Thus, in processing of the ABS 11S, accurate patterning is performed while adverse effect by the returning light is moderated.

Figure 10:
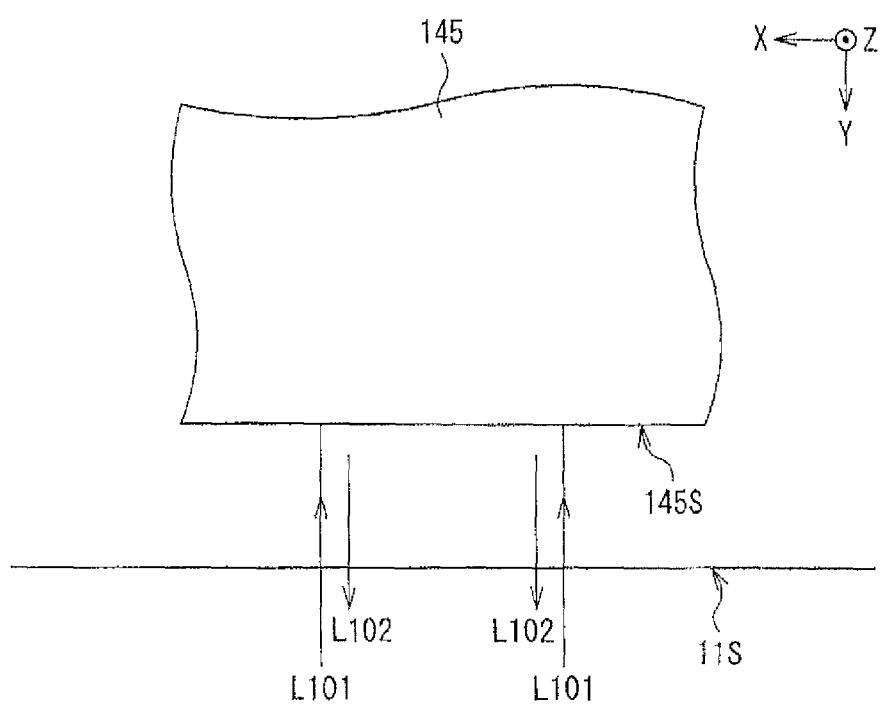
FIG. 10 is a plan view illustrating a main part of a thin film magnetic head as a reference example in an enlarged manner.

In contrast, for example, in a case of a thin film magnetic head illustrated in FIG. 10 as a reference example including a heatsink 145, the heatsink 145 includes a forward end surface 145S parallel to the ABS 11S. In this case, when light L101 traveling perpendicularly to the ABS 11S is incident, the incident light L101 is reflected by the forward end surface 145S to be reflected light L102 that is returning light also traveling perpendicularly to the ABS 11S. Thus, in processing of the ABS 11S, the light may interfere with accurate patterning in photolithography process.

As mentioned above, the present embodiment makes it possible to perform accurate patterning in processing of the ABS 11S. Thus, it is also possible to enhance heat dissipation by increasing the thickness of the heatsink 45. As a result, according to the magnetic disk unit including the thin film magnetic head 10, the slider 4A that includes the ABS 11S processed accurately with high dimension accuracy is provided, which ensures stable floating of the slider 4A during operation and achieves superior heat dissipation. This is advantageous to handling of high density recording.

<Modifications>

As mentioned above, although the invention has been described with reference to some embodiments, the invention is not limited to the above-described embodiments, and various modifications may be made. For example, although the perpendicular magnetic write head of the invention has been applied to a composite head, the application is not necessarily limited thereto, and the perpendicular magnetic write head of the invention may be applied to a write only head not including a read head section.

Also, in the present embodiment, although the CPP-GMR element has been described as an example of the read element, the read element is not limited thereto. Alternatively, the read element may be of current in the plane (CIP) type. Alternatively, a tunneling magnetoresistance (TMR) element including a tunnel junction film may be used.

Further, various modifications may be made on the configuration (the shape) of the main part of the thin film magnetic head. Hereinafter, some modifications of the thin film magnetic head according to the above-described embodiment are described.

First Modification

Figure 5:
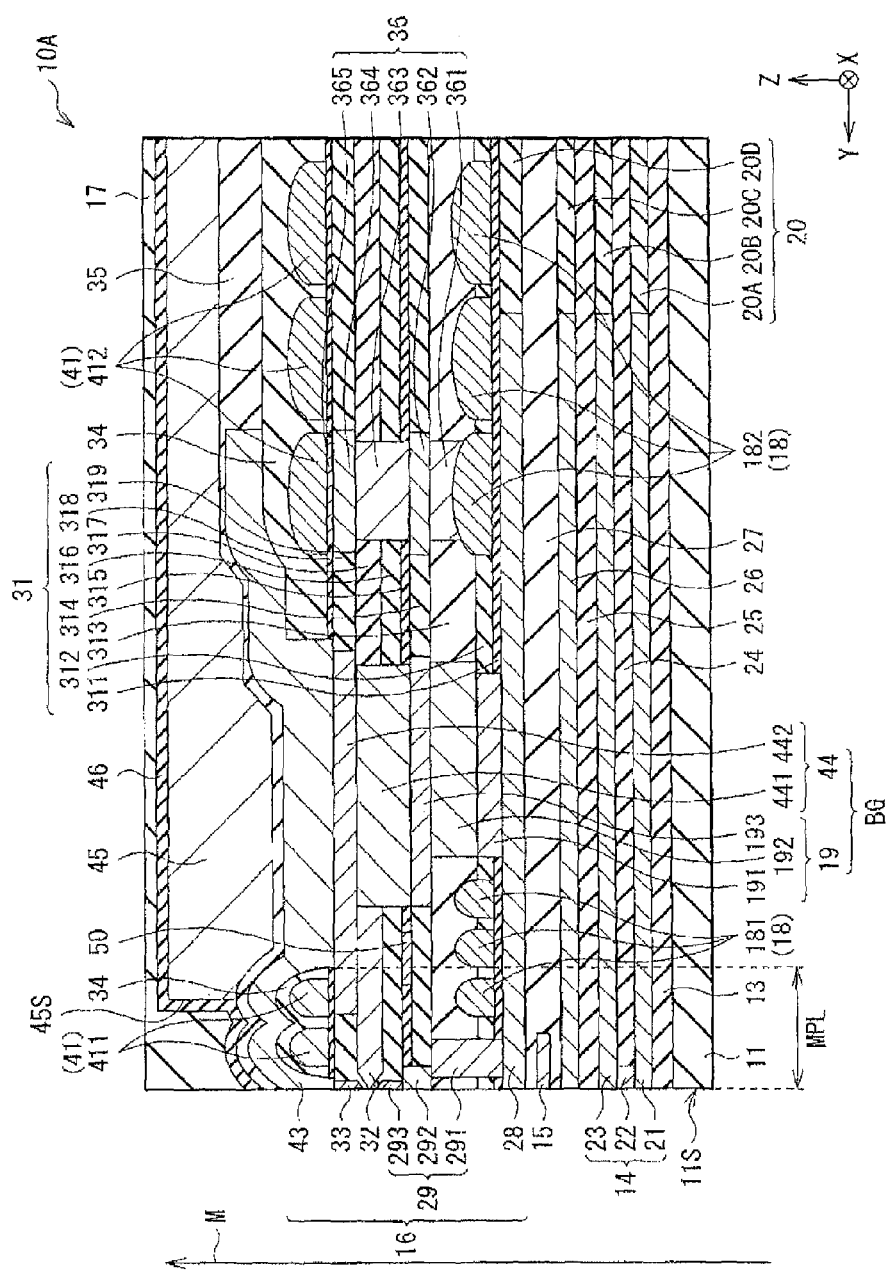
FIG. 5 is a sectional diagram illustrating a structure of a thin film magnetic head according to a first modification of the invention.

For example, FIG. 5 is a sectional diagram illustrating a configuration of a main part of a thin film magnetic head 10A according to a first modification of the above-descried embodiment, and corresponds to FIG. 4 of the above-described embodiment (the thin film magnetic head 10). The thin film magnetic head 10A has a light shielding film 46 that is so formed as to cover at least the forward end surface 45S of the heatsink 45. Examples of a constituent material of the light shielding film 46 may include silicon carbide (SiC), silicon nitride (SiNx), and silicon dioxide (SiO$_2$).

In the present modification, the light shielding film 46 shields the light that has traveled from the ABS 11S, thereby preventing the light from being incident on the forward end surface 45S of the heatsink 45. Thus, also in the present modification, generation of light returning from the forward end surface 45S of the heatsink 45 is suppressed. Effects similar to those in the above-described embodiment can be accordingly expected.

Second Modification

Figure 6:
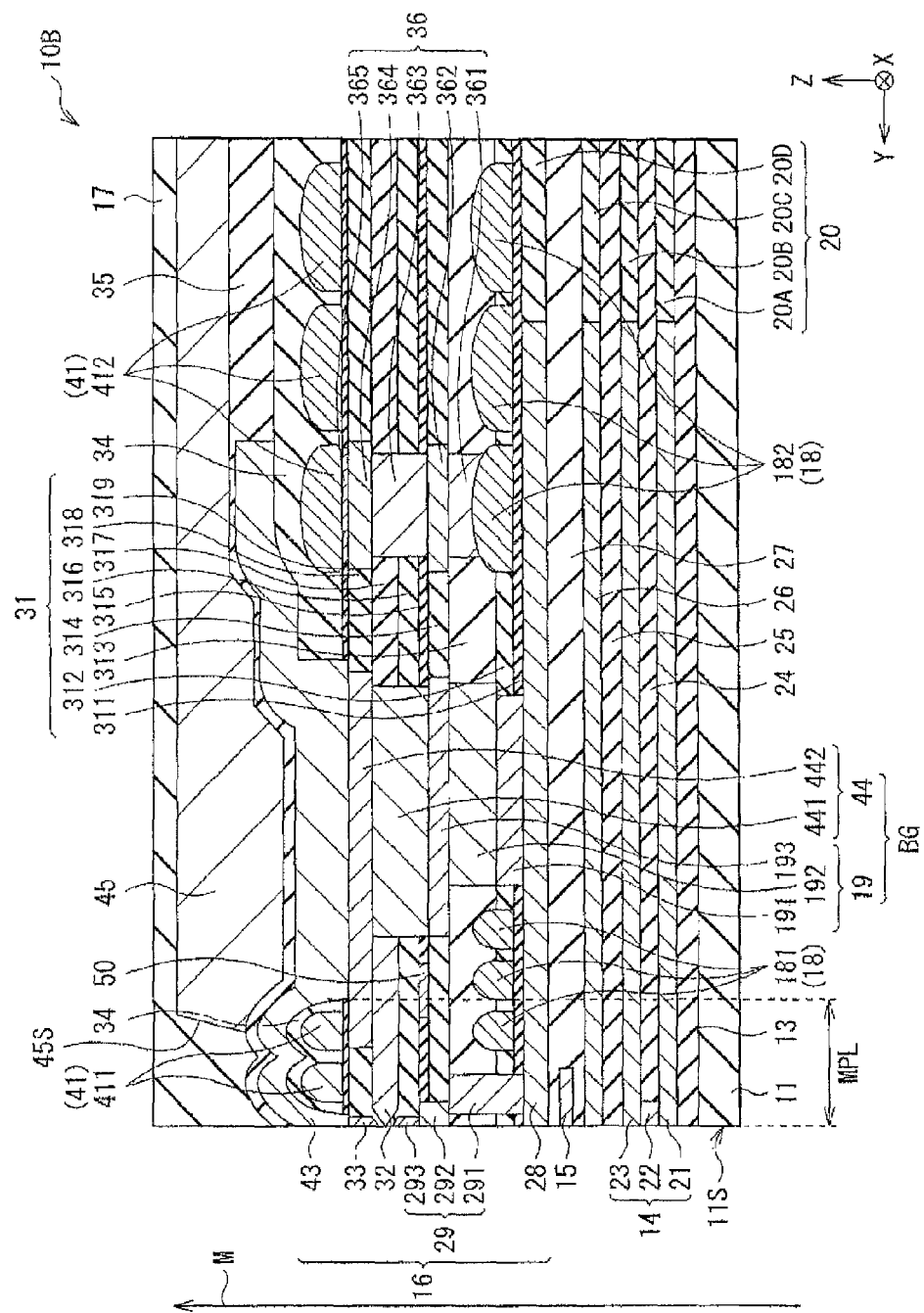
FIG. 6 is a sectional diagram illustrating a structure of a thin film magnetic head according to a second modification of the invention.

FIG. 6 is a sectional diagram illustrating a configuration of a main part of a thin film magnetic head 10B according to a second modification of the above-described embodiment. In the thin film magnetic head 10 of the above-described embodiment, at least a part of the forward end surface 45S is inclined with respect to the ABS 11S in the XY plane. In contrast, in the present modification, at least a part of the forward end surface 45S is inclined with respect to the ABS 11S in the YZ cross-sectional plane. Even in this case, light reflected by the forward end surface 45S of the heatsink 45 travels toward a direction different from the direction of the entering light. Thus, Effects similar to those of the above-described embodiment can be expected.

Third Modification

Figure 7A:
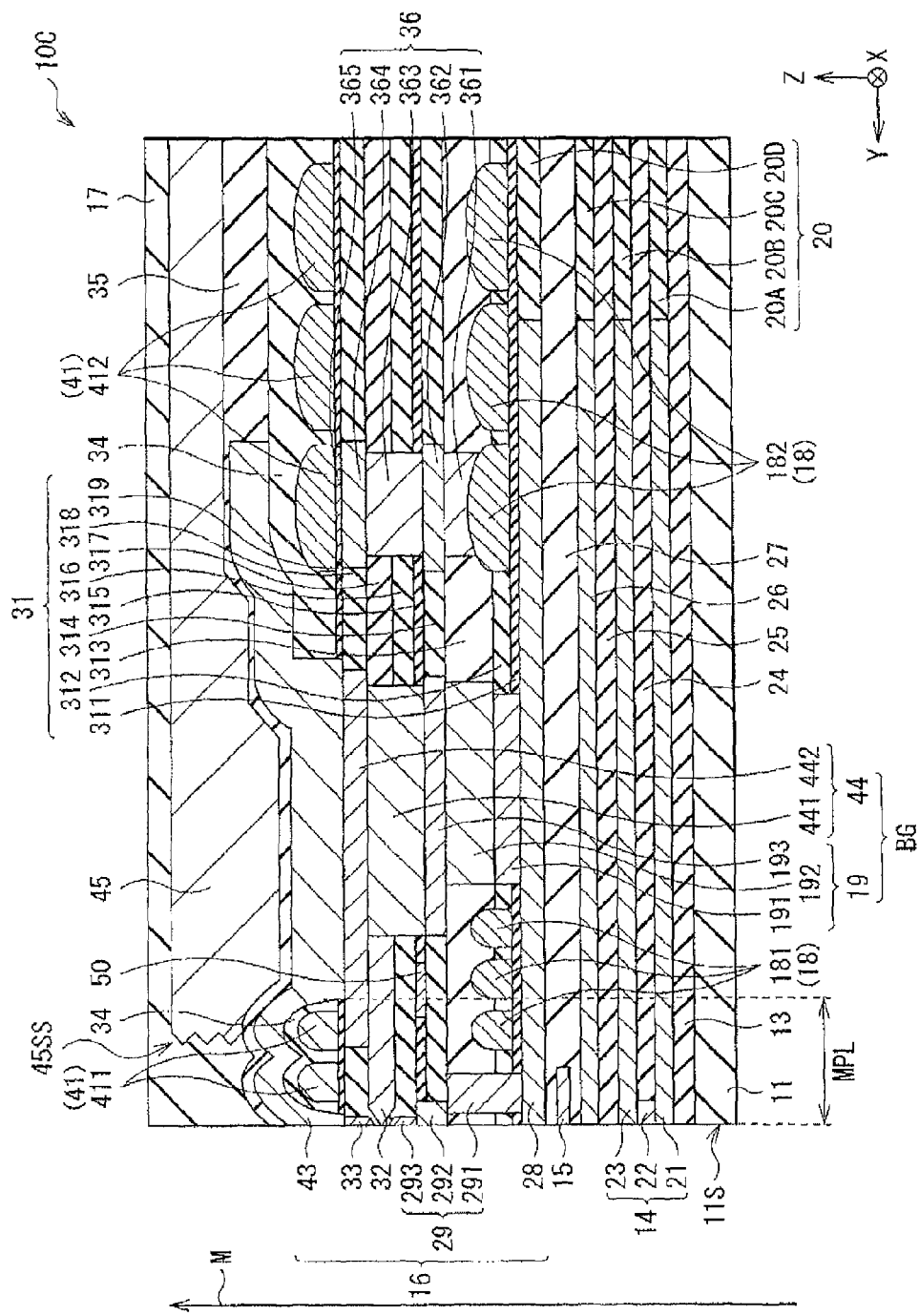
FIG. 7A is a sectional diagram illustrating a structure of a thin film magnetic head according to a third modification of the invention.
Figure 7B:
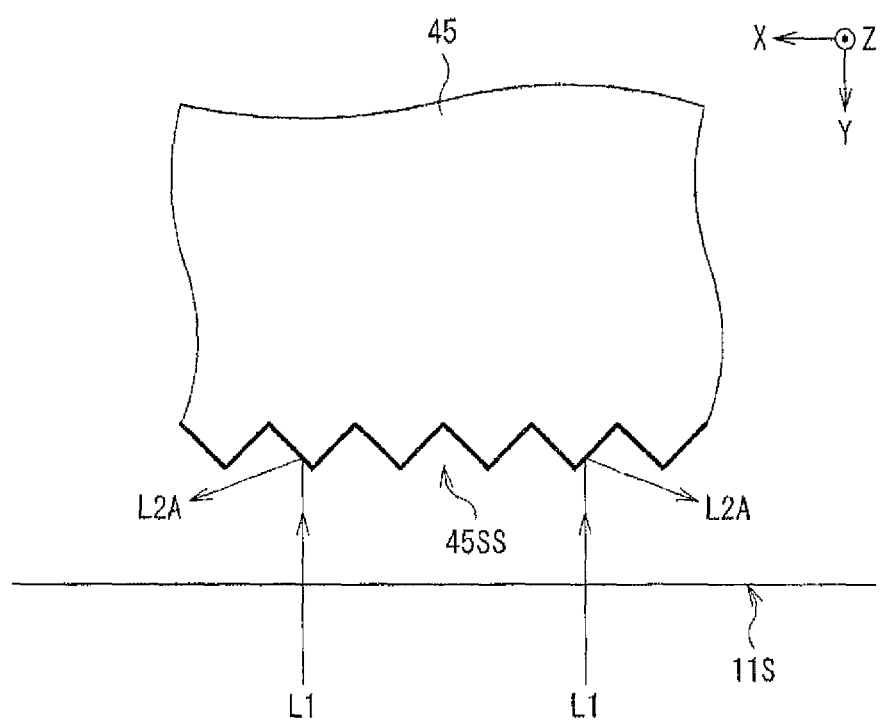
FIG. 7B is a plan view illustrating a main part of the thin film magnetic head of FIG. 7A in an enlarged manner.

FIG. 7A and FIG. 7B are a sectional diagram and a plan view, respectively, each illustrating a configuration of a main part of a thin film magnetic head 10C according to a third modification of the above-described embodiment, and respectively correspond to FIG. 4 and FIG. 3B of the above-described embodiment (the thin film magnetic head 10). In the thin film magnetic head 10 of the above-described embodiment, the forward end surface 45S is a curved smooth surface. In contrast, in the present modification, the heatsink 45 includes a roughened forward end surface 45SS. The roughened forward end surface 45SS has an irregular structure that is formed by selective etching such as milling. In the present modification, although the incident light L1 reaches the heatsink 45, the light L1 is scattered by the roughened forward end surface 45SS, thereby being scattered light L2A. Thus, generation of light returning from the forward end surface 45SS of the heatsink 45 is suppressed also in the present modification. Effects similar to those of the above-described embodiment can be accordingly expected.

Fourth Modification

Figure 8:
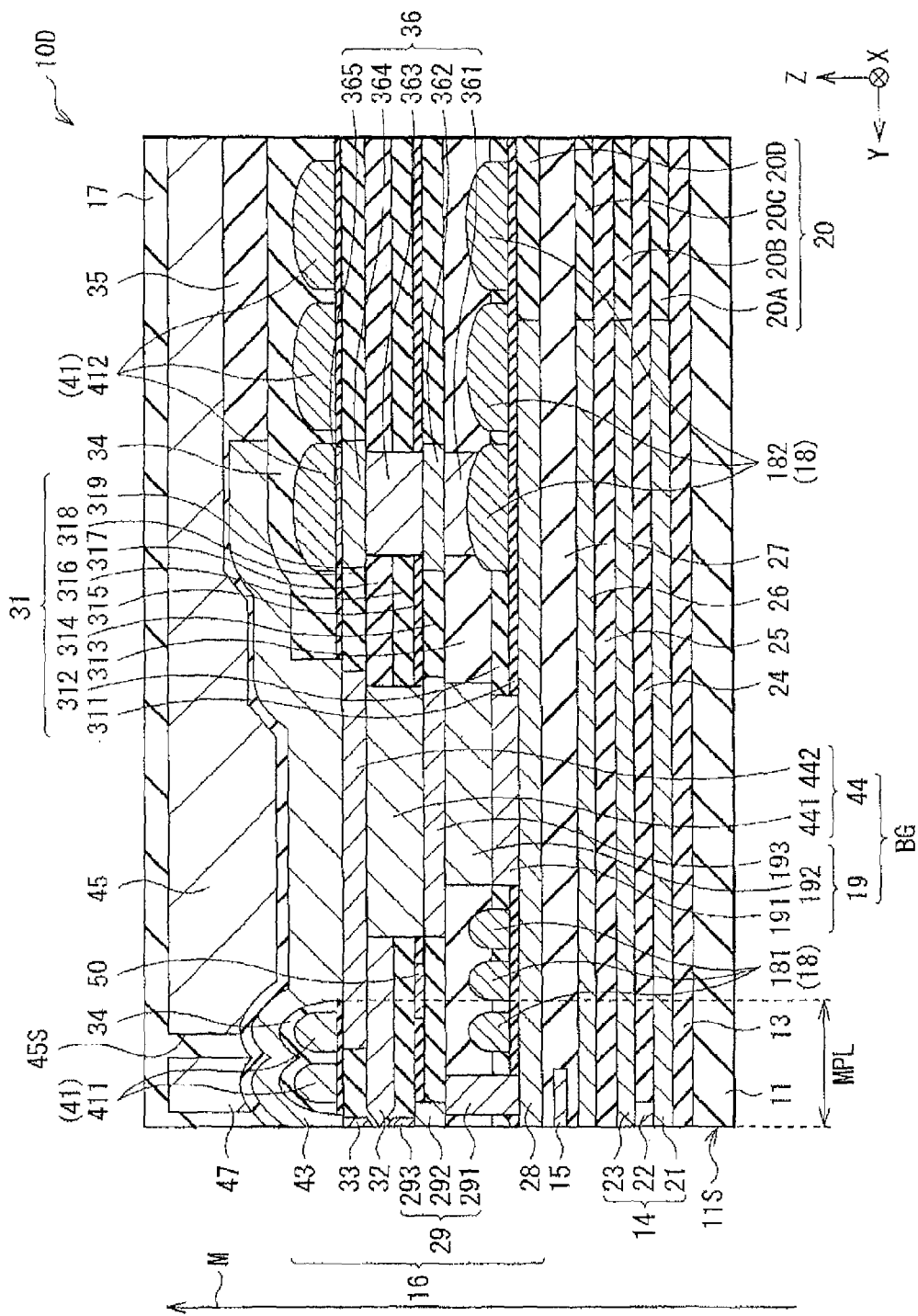
FIG. 8 is a sectional diagram illustrating a structure of a thin film magnetic head according to a fourth modification of the invention.

FIG. 8 is a sectional diagram illustrating a configuration of a main part of a thin film magnetic head 10D according to a fourth modification of the above-described embodiment. In the present modification, a light shielding layer 47 is provided between the ABS 11S and the forward end surface 45SS.

Fifth Modification

Figure 9:
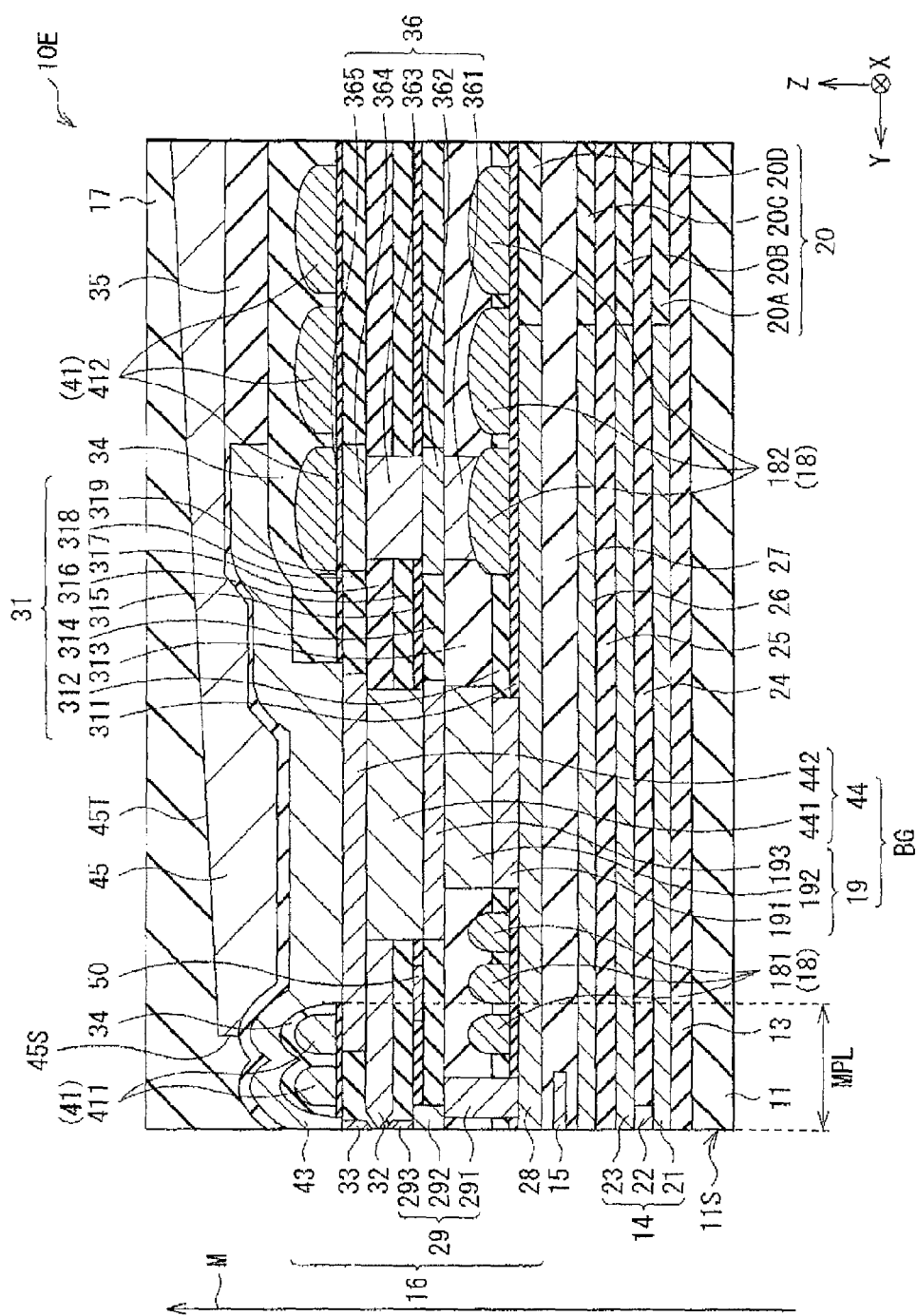
FIG. 9 is a sectional diagram illustrating a structure of a thin film magnetic head according to a fifth modification of the invention.

FIG. 9 is a sectional diagram illustrating a configuration of a main part of a thin film magnetic head 10E according to a fifth modification of the above-described embodiment. In the present modification, the forward end surface 45S is substantially parallel to the ABS 11S, but a top surface 45T of the heatsink 45 is gently inclined along the height direction (the Y-axis direction). Thus, the size of the forward end surface 45S in the thickness direction is extremely small. In other words, the heatsink 45 is so configured as to include a part whose thickness is increased with increasing distance from the ABS 11S (as it goes farther in the −Y direction). Accordingly, it is possible to suppress generation of the light reflected by the forward end surface 45S while securing the volume of the heatsink 45. Thus, effects similar to those of the above-described embodiment can be expected also in the present modification.

Note that the above-described embodiment and the first to fifth modifications may be optionally combined.

The correspondence relationships between the reference numerals and the components of the present embodiment are collectively illustrated as follows.

1 . . . housing, 2 . . . magnetic disk, 3 . . . head arm assembly (HAA), 4 . . . head gimbals assembly (HGA), 4A . . . slider, 4B . . . suspension, 5 . . . arm, 6 . . . driver, 7 . . . fixed shaft, 8 . . . bearing, 9 . . . spindle motor, 10 . . . thin film magnetic head, 11 . . . base, 11A . . . element forming surface, 11S . . . air bearing surface (ABS), 12 . . . insulating layer, 13 . . . insulating layer, 14 . . . read head section, 15 . . . resistance sensor, 16 . . . write head section, 17 . . . capping layer, 18 . . . lower coil, 181 . . . forward part, 182 . . . backward part, 19 . . . lower back gap, 20 (20A to 20D) . . . insulating layer, 21 . . . lower shield layer, 22 . . . MR element, 23 . . . upper shield layer, 24, 25, 27 . . . insulating layer, 26 . . . intermediate shield layer, 28 . . . lower yoke, 29 . . . leading shield, 31 . . . insulating layer, 32 . . . magnetic pole, 33 . . . pedestal yoke, 34, 35 . . . insulating layer, 36 . . . pillar, 41 . . . upper coil, 411 . . . forward part, 412 . . . backward part, 43 . . . upper yoke, 44 . . . upper back gap, 45 . . . heatsink, 45S . . . forward end surface, 46 . . . light shielding film, 47 . . . light shielding layer, BG . . . back gap, 50 . . . heating element.

The invention claimed is:

1. A thin film magnetic head, comprising:
   a magnetic pole including an end surface exposed on an air bearing surface;
   a coil configured to provide a magnetic flux passing through inside of the magnetic pole; and
   a heatsink including an end surface at a position recessed from the air bearing surface, the end surface of the heatsink being configured to suppress reflection causing light that has traveled through an entering position on the air bearing surface to return to the entering position.

2. The thin film magnetic head according to claim 1, wherein the end surface of the heatsink includes a part inclined with respect to the air bearing surface.

3. The thin film magnetic head according to claim 2, wherein the end surface of the heatsink is a curved surface protruding toward the air bearing surface.

4. The thin film magnetic head according to claim 1, wherein the end surface of the heatsink is covered with a light shielding film.

5. The thin film magnetic head according to claim 1, wherein the end surface of the heatsink has surface roughness higher than surface roughness of the end surface of the magnetic pole.

6. The thin film magnetic head according to claim 1, wherein the heatsink has a thickness larger than a thickness of the magnetic pole.

7. The thin film magnetic head according to claim 1, wherein the magnetic pole, the coil, and the heatsink are stacked in order in a down track direction.

8. The thin film magnetic head according to claim 1, further comprising a yoke that is provided between the coil and the heatsink.

9. The thin film magnetic head according to claim 1, further comprising a light shielding member that is provided between the air bearing surface and the end surface of the heatsink.

10. A head gimbals assembly, comprising:
    a magnetic head slider including the thin film magnetic head according to claim 1 provided on a side surface thereof; and
    a suspension having an end to which the magnetic head slider is attached.

11. A head arm assembly, comprising:
    a magnetic head slider including the thin film magnetic head according to claim 1 provided on a side surface thereof;
    a suspension having an end to which the magnetic head slider is attached; and
    an arm supporting the other end of the suspension.

12. A magnetic disk unit with a magnetic recording medium and a head arm assembly, the head arm assembly comprising:
    a magnetic head slider including the thin film magnetic head according to claim 1 provided on a side surface thereof;
    a suspension having an end to which the magnetic head slider is attached; and
    an arm supporting the other end of the suspension.

* * * * *